June 24, 1930.                G. R. BELLAH                1,766,212
                              HAND CULTIVATOR
                            Filed Nov. 26, 1928
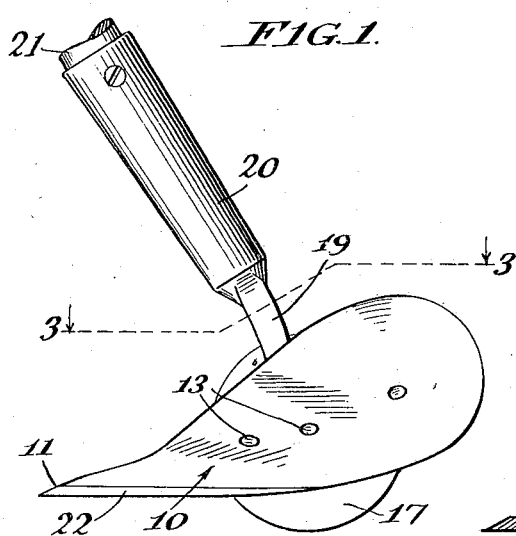
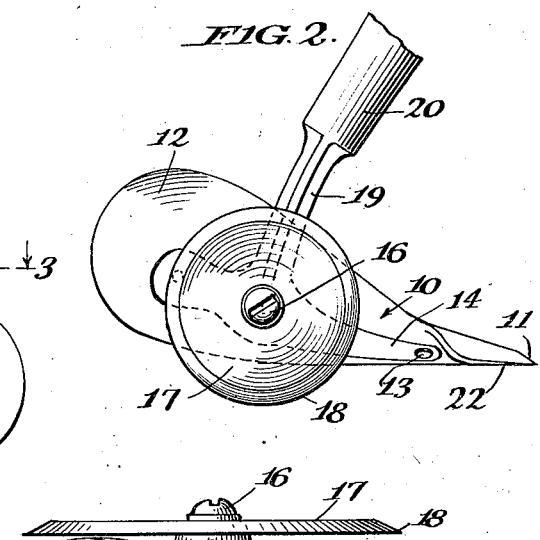
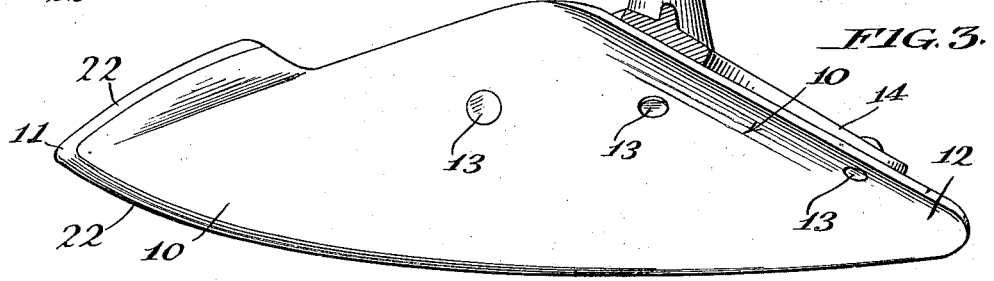
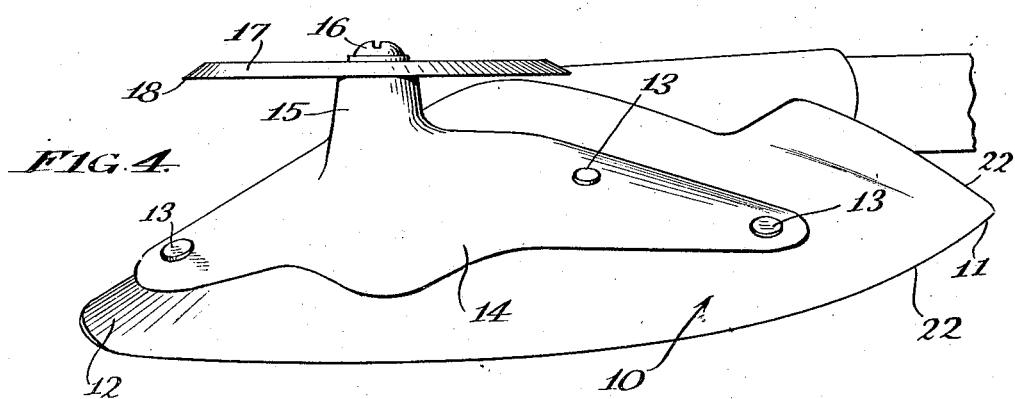
INVENTOR.
George R. Bellah
by Martin P. Smith, Atty.

Patented June 24, 1930

1,766,212

UNITED STATES PATENT OFFICE

GEORGE R. BELLAH, OF LOS ANGELES, CALIFORNIA, ASSIGNOR OF ONE-HALF TO E. J. NAFFZIGER, OF GLENDALE, CALIFORNIA

HAND CULTIVATOR

Application filed November 26, 1928. Serial No. 321,849.

My invention relates to a hand cultivator of the particular type disclosed in my co-pending application for U. S. Letters Patent filed April 12, 1928, Serial No. 269,392, and the principal objects of my present invention are to generally improve upon and simplify the construction of the device disclosed in my aforesaid application as well as other forms and types of similar garden tools; further, to combine with the cultivator shovel that forms the body of the tool, a disc coulter that cooperates with the shovel in forming a practical, convenient and efficient garden tool and hand cultivator; further, to provide a relatively simple, strong and durable one-piece cast metal bracket that functions as a support and connection for the cultivator body and the cutting disc or coulter and further, to form integral with said bracket a tubular socket that receives the handle of the tool or cultivator.

With the foregoing and other objects in view, my invention consists in certain novel features of construction and arrangement of parts that will be hereinafter more fully described and claimed and illustrated in the accompanying drawings in which:

Fig. 1 is a side elevational view of my improved tool and showing the cultivator shovel side thereof.

Fig. 2 is a side elevational view of the tool and showing the cutting disc or coulter side thereof.

Fig. 3 is an enlarged horizontal section taken on the line 3—3 of Fig. 1.

Fig. 4 is a view looking against the underside of the tool.

Referring by numerals to the accompanying drawings which illustrate a practical embodiment of my invention, 10 designates the cultivator blade or share having a pointed forward end 11 and an upwardly and laterally curved rear portion 12, the latter being shaped so as to deflect the earth and turf outwardly to one side of the tool as the same is drawn forwardly through the ground.

Arranged on the rear face of the shovel and secured thereto in any suitable manner, preferably by means of rivets 13, is a cast metal plate 14 of irregular outline and formed integral with the central portion of said plate is an outwardly projecting cylindrical stud 15.

Seated in said stud is a headed pin or screw 16 and mounted to rotate freely thereupon is a metal disc 17 having a sharp cutting edge 18 and which disc functions as a coulter when the tool is in use.

Formed integral with and projecting upwardly and forwardly from the central portion of the plate 14 and preferably at the point where the stud 15 unites with the plate 14 is a short arm 19 and formed integral with and projecting upwardly and forwardly from said arm is an elongated tubular socket 20 into which is fitted the lower end of the handle 21 that is utilized in manipulating the tool.

In the use of my improved garden tool or cultivator the same is drawn forwardly through the surface of the ground after the manner of an ordinary hoe and the pointed forward end of the shovel enters the ground and uplifts a portion thereof, and as the shovel continues the forward motion the uplifted portion of the ground or turf is deflected laterally by the curved rear portion 12 of the shovel.

The side edges of the blade or shovel 10 to the rear of the pointed forward end 11 are sharpened to form cutting edges 22, and these edges pass readily through the ground, and by proper manipulation of the tool said edges may be utilized in cutting the roots of weeds at points just above or below the surface of the ground.

The movement of the tool during use is rendered facile by the disc 17 which performs the functions of a rolling support as well as a coulter for cutting thru the earth or turf at the side of the tool, thereby enabling the same to be drawn forwardly in a substantially straight line.

The coulter may also be utilized as a lawn edger when the tool is drawn along the edge of a lawn adjacent to a walk or pavement.

The plate 14 provided with the integral stud 15 functions as a reinforcement for the shovel or blade and at the same time provides a strong and substantial connection between said shovel or blade, and the coulter and the handle that is used in manipulating the tool.

Thus it will be seen that I have provided a hand cultivator that is relatively simple in construction, inexpensive of manufacture and very effective in performing the functions for which it is intended.

It will be understood that minor changes in the size, form and construction of the various parts of my improved hand cultivator may be made and substituted for those herein shown and described without departing from the spirit of my invention, the scope of which is set forth in the appended claims.

I claim as my invention:

1. In a hand cultivator, the combination with a cultivator shovel, of a plate secured to the rear face of said shovel, a stud formed integral with and projecting outwardly from the center of said plate, a disc coulter journalled on said stud, an arm formed integral with and projecting upwardly from the center of said plate, and a handle receiving socket formed integral with the upper end of said arm.

2. A hand cultivator comprising a cultivator shovel having a pointed forward end and an upwardly and laterally curved rear portion, a plate secured to the rear face of said shovel, a stud formed integral with and projecting laterally from the central portion of said plate, a disc coulter journalled on said stud, an arm formed integral with and projecting upwardly from said plate, and a handle receiving socket formed integral with and projecting upwardly from said arm.

In testimony whereof I affix my signature.

GEORGE R. BELLAH.